United States Patent [19]

DuBosque, Jr. et al.

[11] 4,112,566
[45] Sep. 12, 1978

[54] METHOD OF MANUFACTURING HEAT EXCHANGE PANELS

[75] Inventors: Clayton DuBosque, Jr.; Wallace C. Rudd, both of New Canaan, Conn.; Richard J. Allen, New Rochelle, N.Y.

[73] Assignee: Thermatool Corp., Stamford, Conn.

[21] Appl. No.: 790,330

[22] Filed: Apr. 25, 1977

[51] Int. Cl.² .............................................. B23P 15/26
[52] U.S. Cl. .......................... 29/157.3 C; 113/118 C; 219/102; 228/160; 228/183; 165/171; 126/271
[58] Field of Search ................... 29/157.3 R, 157.3 C, 29/157.3 AH, 456, 157.4; 113/118 C, 118 R; 219/102, 107, 62; 228/160, 173 R, 173 C, 173 F, 183; 165/171; 126/271

[56] References Cited

U.S. PATENT DOCUMENTS

| 2,091,584 | 8/1937 | Brown | 113/118 R |
|---|---|---|---|
| 2,202,756 | 5/1940 | Cline | 126/271 |
| 2,208,789 | 7/1940 | Cally | 126/271 |
| 2,376,762 | 5/1945 | Ferguson | 219/62 |
| 2,821,619 | 1/1958 | Rudd | 219/107 |
| 3,229,765 | 1/1966 | Phillips | 29/157.3 C |
| 3,319,040 | 5/1967 | Rudd | 219/102 |

FOREIGN PATENT DOCUMENTS

| 117,206 | 7/1943 | Australia | 29/157.3 R |
|---|---|---|---|
| 927,037 | 10/1947 | France | 165/171 |

Primary Examiner—Lowell A. Larson
Assistant Examiner—Daniel C. Crane
Attorney, Agent, or Firm—Brooks, Haidt, Haffner & Delahunty

[57] ABSTRACT

Methods for manufacturing heat exchange panels each comprising metal tubes of finite length welded to a metal sheet except at the end portions of the tubes which are secured to headers in fluid-tight relation thereto, in which methods the metal sheet, having end edges and side edges, is formed into a hollow cylinder with the end edges adjacent each other and metal tubing is welded to the cylinder in a spiral path. Welding is interrupted adjacent the end edges and the tubing is cut above the end edges to provide tubes welded to the cylinder except at end portions of the tubes. The end portions of the tubes, after the cylinder-tube combination is formed to the desired shape, e.g., flat, are secured to the headers. If tubes parallel to the side edges of the sheet are desired, the hollow cylinder is formed with adjacent portions of the side edges in axially offset relation prior to welding the tubing to the cylinder.

10 Claims, 10 Drawing Figures

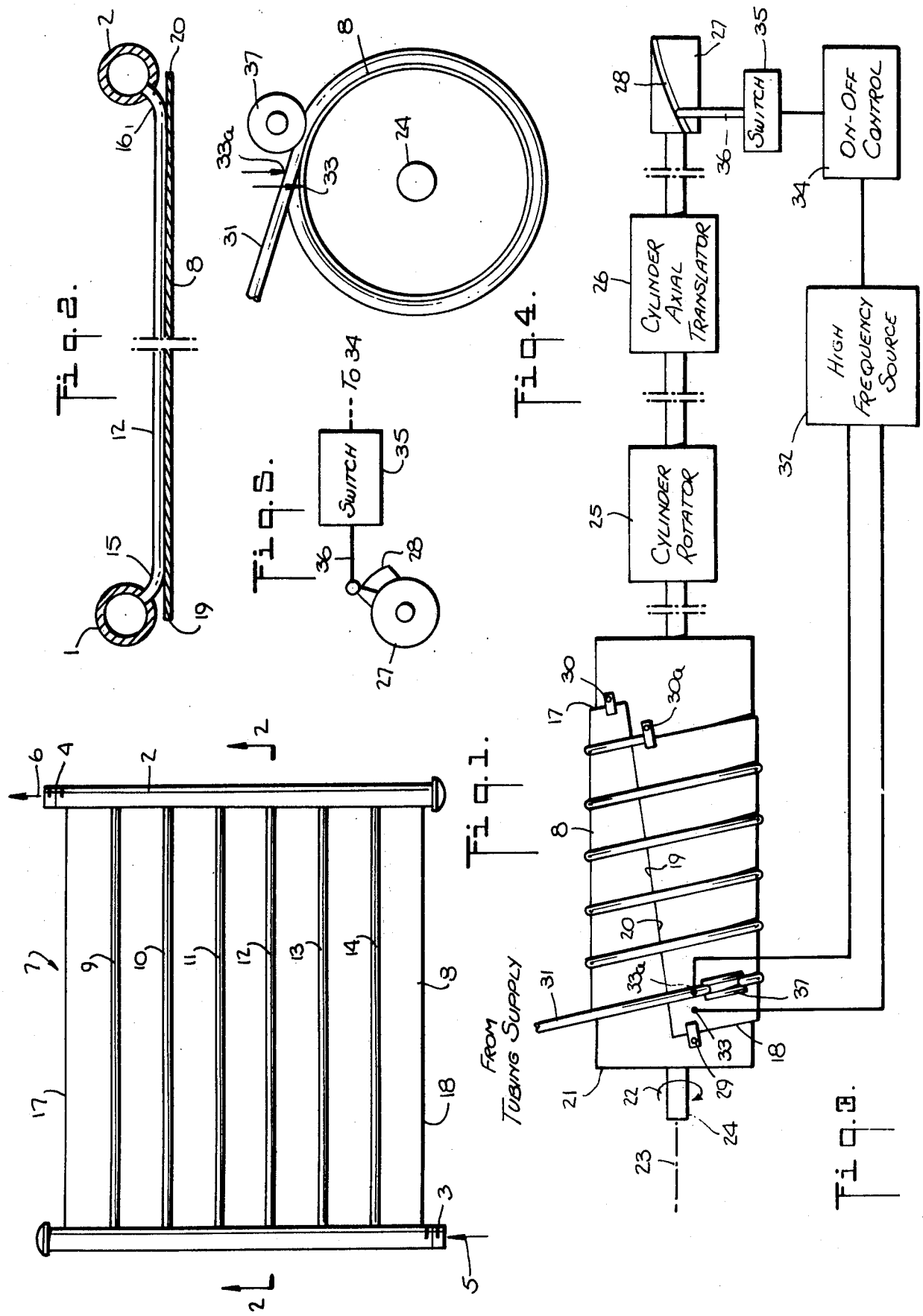

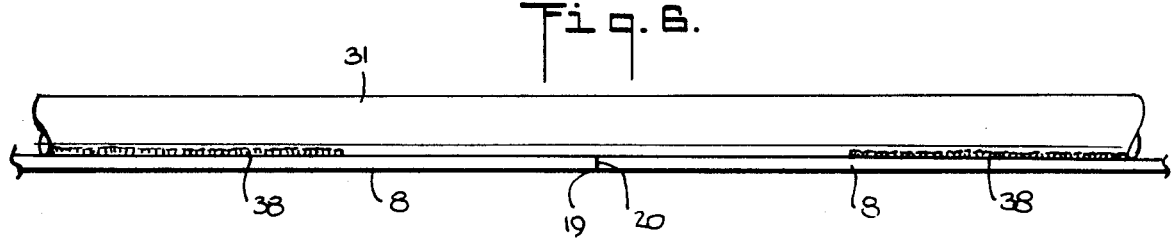
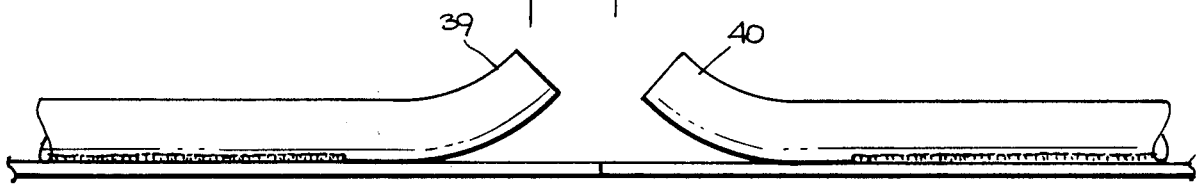
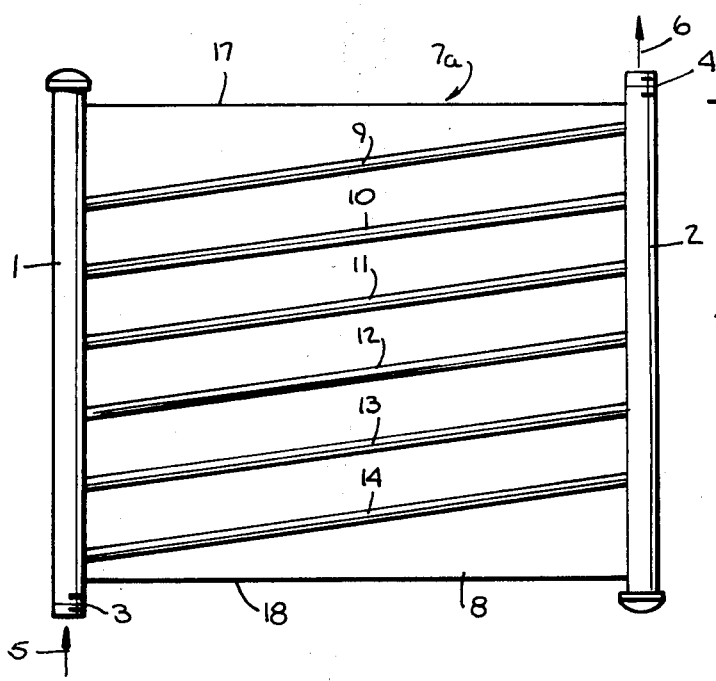
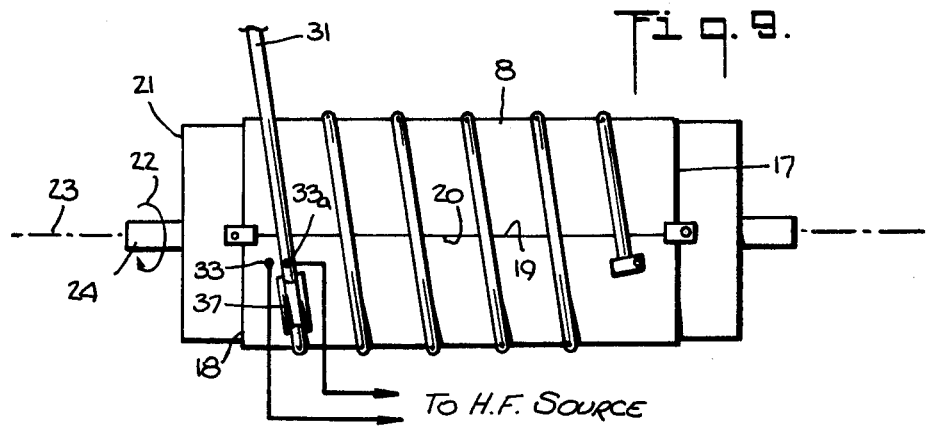

METHOD OF MANUFACTURING HEAT EXCHANGE PANELS

This invention relates to the manufacture of heat exchange panels of the type sometimes known as solar panels, which comprise heat absorbing metal sheets having tubing for conveying fluid secured to the sheets in good heat conducting relation thereto.

Interest in collecting energy from the sun for heating and other purposes has increased in recent years. In some systems, panels of heat absorbing metal sheets having fluid containing tubing secured to the sheets in good heat conducting relation thereto are used. The tubing may be made of aluminum, copper, coated steel, etc., and the sheet may be made of the same or different metals. The sheets are the principal heat collecting elements and have a relatively large area, and the tubing acts as a fluid conduit for a fluid, such as water, which absorbs heat from the tubing and which is pumped to a point, usually remote from the panels, where the heat is extracted from the fluid.

In a given installation, there may be one large panel or several smaller panels, the length of a panel, in the length direction of the tubing, often being of the order of 6 to 10 feet. A panel may have several lengths of spaced apart lengths of tubing. In some cases, the tubing on a panel may be continuous and extend along a serpentine path, and in other cases, individual lengths of tubing, parallel to each other, may be mounted on the underlying sheet. In either case, the ends of the tubing usually are secured to a pair of headers, either mechanically or by soldering or brazing, which supply the fluid to, and remove the fluid from, the tubing.

In order to be efficient in the transfer of heat from the sheet to the tubing and then to the fluid, there should be a good heat transfer connection between the tubing and the sheet. Generally, this is difficult to obtain with mere mechanical contact between the tubing and the sheet, and resort is had to soldering, brazing or welding of the tubing to the sheet to obtain the desired heat transfer. The prior art methods of accomplishing the soldering, brazing or welding which have been used to make solar panels are relatively time consuming and expensive. Accordingly, a significant part of the cost of a solar panel installation is the cost of making the panels.

High frequency electrical welding of tubing to metal sheet by means of the apparatus and methods disclosed in U.S. Pat. Nos. 2,821,619 and 3,319,040 is known in the art. In accordance with such methods, the sheet and tubing are continuously advanced to and past a weld point with the sheet and tubing slightly spaced in advance of the weld point and are forge welded together at the weld point. A short distance in advance of the weld point, high frequency electric current, e.g., of 50 kilohertz or higher, is supplied to the tubing and the sheet by means of contacts, such current heating the facing surfaces of the sheet and tubing to welding temperature by the time they reach the weld point. With such methods, tubing can be welded to sheet at speeds of 300 feet per minute or higher. However, as far as we are aware, such methods have not heretofore been used for the manufacture of panels of the type described hereinbefore.

One object of the invention is to provide methods of making heat exchange panels useful as solar panels which permit the making thereof at relatively high speeds and relatively inexpensively as compared to methods previously used.

From the energy collecting standpoint, there is little difference in energy collection whether the tubing runs parallel to the side edges of the panel or runs at an acute angle with respect thereto, but the demand in the art is for tubing which runs substantially parallel to the side edges of the panel. Another object of the invention is to provide a method for economically making, at high speed, a panel of a single sheet of metal with several lengths of tubing welded thereto and extending substantially parallel to the side edges of the panel.

In accordance with the preferred embodiment of the method of the invention, a sheet of metal of the size of the desired panel is formed into a hollow cylinder with the edges of the sheet at the cylinder ends, corresponding to the panel side edges, in offset or non-aligned relation and, preferably, with the end edges of the metal sheet in abutting relation. Tubing is then wound spirally around and welded to the exterior surface of the cylinder using the techniques described in said patents, that is, by rotating the cylinder and bringing the tubing tangentially toward the cylinder until the tubing contacts the cylinder at a weld point, and in advance of the weld point, supplying high frequency electric current to the tubing and the cylinder to cause the facing surfaces thereof to heat up to the welding temperature as they reach the weld point. The pitch of the spiral in which the tubing is wound is substantially equal to the offset of the side edges of the metal sheet, and welding current is interrupted in synchronism with the rotation of the cylinder and so that, just prior to and shortly after the tubing passes over the end edges of the cylinder, no welding takes place thereby causing short portions of the tubing to be unwelded to the cylinder adjacent said end edges. After the tubing has been so-welded to the cylinder, the tubing is severed at the cylinder end edges, and the panel is flattened and straightened which results in a panel of sheet metal with several lengths of tubing welded to the sheet metal, except at the end portions, and extending substantially parallel to the side edges of the panel. The free ends of the tubing may then be secured in fluid-tight relation to headers by mechanical means or by soldering or brazing.

In an alternative method of the invention for producing a panel of metal sheet with the tubing running at an acute angle to the side edges of the sheet, the steps are the same as those of the preferred method described hereinbefore, except that the metal sheet is formed into a hollow cylinder with aligned side edges.

Other objects and advantages of the present invention will be apparent to those skilled in the art from the following detailed description of presently preferred embodiments, which description should be considered in conjunction with the accompanying drawings in which:

FIG. 1 is a diagrammatic, plan view of a heat exchange panel constructed in accordance with the invention;

FIG. 2 is a cross-sectional, end view of the embodiment shown in FIG. 1 and is taken along the line 2—2 indicated in FIG. 1;

FIG. 3 is a diagrammatic, plan view of apparatus for the manufacture of part of the heat exchange panel shown in FIG. 1;

FIG. 4 is a diagrammatic, end view of a portion of the apparatus shown in FIG. 3;

FIG. 5 is a diagrammatic, end view of the switching portion of the apparatus shown in FIG. 3;

FIGS. 6 and 7 are enlarged, fragmentary, side elevation views of a portion of the panel manufactured with the apparatus shown in FIG. 3;

FIG. 8 is a diagrammatic, plan view of an alternative form of heat exchange panel constructed in accordance with the invention;

FIG. 9 is a fragmentary, plan view of the apparatus shown in FIG. 3 used for manufacturing a portion of the heat exchange panel shown in FIG. 8; and FIG. 10 is an end elevation view of a modified form of switching apparatus for use in conjunction with the apparatus shown in FIG. 9.

With reference to FIGS. 1 and 2, a panel of the type with which the invention is concerned comprises a pair of headers 1 and 2 having threaded ends 3 and 4 to which a fluid supply, such as a water supply, is connected for supplying the fluid to the header 1 as indicated by the arrow 5 and removing the fluid from the header 2 as indicated by the arrow 6. Intermediate the headers 1 and 2 is a panel 7 which comprises metal sheet material 8 having secured thereto by welding a plurality of tubes 9–14. Each of the free end portions of the tubes 9–14 is secured at its opposite end in fluid-tight relation to the headers 1 and 2 by any well-known means, such as by soldering or brazing, or by a mechanical fitting. The sheet material 8 and the tubes 9–14 may be colored, such as by painting with black paint, so as to increase the heat absorbing ability of the panel 7.

Each tube 9–14 is of finite length, e.g., having a length of from about 4 to 15 feet, and the free end portions 15 and 16 of the tube 12 are shown in FIG. 2. Such free end portions 15 and 16 are relatively short as compared to the lengths of the tubes 9–14 and may, for example, be from about 2 to 6 inches in length. As described hereinafter, such portions 15 and 16 are not welded to the metal sheet material 8 during the welding of the remainder of the tube 12 to the metal sheet material in order to provide tube ends suitable for connection to the headers 1 and 2. The portions 15 and 16, and the corresponding portions of the other tubes 9–11, 13 and 14 preferably are as short as possible, consistent with the requirement of ease of assembly with the headers 1 and 2, in order to have the maximum amount of good heat conductive connection between the tubes 9–14 and the metal sheet material 8. It will be noted that to attempt to provide the portions 15 and 16 by first welding the entire length of the tube 12 to the material 8 and then separating the portions 15 and 16 from the material 8 would be impractical, not only from the standpoint of the labor required, but also from the standpoint of difficulty in separating the portions 15 and 16 from the material without damage or distortion to the portions. It is, of course, desirable to have relatively smooth and undistorted end portions 15 and 16 for ease in providing a fluid-tight connection with the headers 1 and 2.

For providing a long life in use and for providing good heat transfer, the tubes 9–14 usually are made of copper or aluminum, but they may be made of other metals, such as, coated, aluminized or galvanized steel. The sheet material 8 is made of similar metals and may be made of the same metal as the tubes 9–14 or a different metal. Typically, the tubes 9–14 may have an outside diameter from one-quarter to one-half inch and a wall thickness from 0.012 to 0.062 inches, and the metal sheet material 8 may have a width and length from 4 to 15 feet and a thickness from 0.010 to 0.062 inches.

In the embodiment of a panel illustrated in FIGS. 1 and 2, the panel 7 has a pair of side edges 17 and 18 and a pair of end edges 19 and 20, and the tubes 9–14 are parallel to each other and to the side edges 17 and 18. The preferred method of the invention which will be described in connection with FIGS. 3–7 provides the panel 7 shown in FIGS. 1 and 2.

One form of apparatus which may be employed for carrying out a portion of the preferred method of the invention is illustrated in FIGS. 3–5 and comprises a cylinder 21 mounted for rotation in the direction of the arrow 22 around its axis 23. The cylinder 21 is mounted on a shaft 24 which is supported by any conventional means (not shown) and which is rotatable by a conventional drive, or cylinder rotator, 25. The shaft 24 is also mounted so that it may be moved in the direction of the axis 23 by a conventional translator 26, e.g., a threaded shaft engaging a stationary threaded nut. The shaft 24 also carries or drives a cam 27 having an axially and radially extending projecting surface 28 for purposes hereinafter described.

With the cylinder 21 in its leftmost position, as viewed in FIG. 3, a metal sheet 8, the size of the desired panel 7, is wrapped around the cylinder 21 with its end edges 19 and 20 in abutting relation and with adjacent portions of the side edges 17 and 18 offset in the direction of the axis 23, as shown in FIG. 3, by a distance approximately equal to the distance between each pair of the tubes 9–14. The sheet 8 is then clamped on the cylinder 21 by clamps, such as the clamps 29 and 30, as well as others not shown.

Tubing 31 is then secured at its free end to the cylinder 21, such as by a clamp 30a, and a high frequency source 32, not energized at this point, is connected to the tubing 31 and the sheet 8 by means of a pair of contacts 33 and 33a in sliding contact with the sheet 8 and the tubing 31. Rotation and axial translation of the cylinder 21 and energization of the source 32 is initiated, causing the tubing 31 to be wrapped spirally around the metal sheet 8 and to be welded to the latter as long as electric current is supplied by the source 32. The rotation of the cylinder 21 and the energization of the source 32 is co-ordinated in such a manner that the tubing 31 is not welded to the sheet 8 until a short time after the end edge 19 passes below the tubing 31.

The current from the source 32, supplied to the tubing 31 and the sheet 8 in advance of where they contact, heats the facing surfaces thereof to welding temperature by the time they contact and, preferably, at their point of contact they are pressed together by a roller 37 with forge welding pressure.

The source 32 is controlled by an on-off control 34 which may, for example, be an oscillator control of the type described in U.S. Pat. No. 3,319,040. The control 34 is connected to a switch 35 which is operable by the surface 28 on the cam 27. Thus, when the arm 36 of the switch 35 is engaged by the surface 28, no current is supplied to the tubing 31 and the sheet 8 and no weld is produced therebetween. The surface 28 is selected so that for a short distance before and after the end edges 19 and 20 pass below the tubing 31, the tubing 31 is not welded to the sheet 8. However, for the remainder of the circumference of the sheet 8, the tubing 31 is welded thereto by a continuous weld. The unwelded portion is small relative to the circumference of the sheet 8. For example, the unwelded portion may have a length of 4 to 12 inches, whereas the circumference of the sheet 8, or distance from the end 19 to the end 20, may be 4 to 15 feet.

When a number of turns of the tubing 31 sufficient to produce the desired number of tubes 9–14 have been welded to the sheet 8, movement of the cylinder 21 and the supply of current from the source 32 is discontinued. Although the tubing 31 may be cut above the edges 19 and 20 as the cylinder 21 is rotated, preferably, cutting of the tubing 31 above the edges 19 and 20 is not effected until the movement of the cylinder 21 is stopped. Thereafter, the sheet 8 with the tubing 31 welded thereto, except adjacent to the end edges 19 and 20, is removed from the cylinder 21 and formed into the desired shape. Thus, if a flat panel 7 of the type shown in FIG. 1 is desired, the sheet metal 8 is flattened and the edges 17 and 18 are straightened as necessary to provide a flat panel with tubes 9–14 parallel to each other and the side edges 17 and 18. Of course, if desired, the sheet may be otherwise shaped, e.g., it may be arcuate as viewed from the side.

FIG. 6 illustrates in fragmentary, enlarged, end view, the tubing 31 welded to the sheet 8 in accordance with the invention. Thus, the tubing 31 is continuously welded to the sheet 8 at 38, but the weld is interrupted a short distance before and after the end edges 19 and 20. FIG. 7 illustrates the tubing 31 and the sheet 8 after the tubing 31 has been cut above the end edges 19 and 20 and bent away from the sheet to provide two free end portions 39 and 40. The portions of the sheet 8 below the portions 39 and 40 may be left untouched as shown in FIG. 2, or may be cut away. Also, instead of bending the portions 39 and 40 as shown in FIG. 7, they may be left unbent, and the portions of the sheet 8 below the portions 39 and 40 may be cut away or bent downwardly. The end portions 39 and 40 and the metal of the cylinder 8 may be separated before or after the cylinder 8 with the tubes 9–14 welded thereto is formed to the desired shape. The portions 39 and 40 preferably are made as short as possible, e.g., 2 to 6 inches in length, consistent with the requirement of ease of assembly with the headers 1 and 2, in order to have the maximum amount of good heat conductive connection between the tubes 9–14 and the sheet 8.

When the panel 7 has been completed as described, it is assembled in an obvious manner with the headers 1 and 2, the free end portions of each length of tubing, such as the portions 39 and 40, being inserted into openings in the headers 1 and 2 and being secured in fluid-tight relation to the headers 1 and 2 in a conventional manner, such as by mechanical fittings, brazing or soldering.

If a panel 7a of the type illustrated in FIG. 8 is acceptable, that is, if the customer will accept a panel 7a which has the tubes 9–14 extending in the direction from one end edge of the sheet 8 to the other end edge thereof but with the tubes 9–14 extending at an acute angle to the side edges 17 and 18, the method of the invention may also be used. However, in this case, the sheet edges 17 and 18 are aligned, as shown in FIG. 9, when the sheet 8 is formed into a hollow cylinder around the cylinder 21. The end edges 19 and 20 will then be parallel to the axis 23 of the cylinder 21 and the three-dimensional cam 27 may be replaced by a simple plate cam 27a having a switch actuating projection 28a shown in FIG. 10. Otherwise, the method for forming the panel 7a and interconnecting it with the headers 1 and 2 is the same as the method for forming the panel 1 and interconnecting it with the headers 1 and 2.

In the description of the embodiment of the invention described hereinbefore, it has been indicated that it is preferred that the end edges 19 and 20 be in abutting relation during the welding of the tubing 31 to the sheet 8. Such arrangement is preferred both for alignment reasons and for the purpose of avoiding possible arcing between the contact 33 and the sheet 8 or the cylinder 21 when the contact 33 passes from the end edge 19 to the end edge 20. However, it will also be noted that with certain lengths of the portions 39 and 40, no current will be flowing when the contact 33 passes from the edge 19 to the edge 20. Also, if the contact 33 has sufficient area and the spacing between the edges 19 and 20 is sufficiently small, the contact 33 will contact the edge 20 before it leaves the edge 19, and in some cases, the contact 33 may contact the cylinder 21 for a short time, the current flowing from the cylinder 21 to the sheet 8. Accordingly, it is not necessary that the edges 19 and 20 be in abutting relation, and instead, they may be spaced apart a distance depending upon the conditions of welding.

In addition, it is preferred that the cylindrical sheet 8 be rotated about and moved longitudinally of its axis during the welding of the tubing 31 thereto because the electrical connections carry relatively high current at high frequency and the electrical requirements are simpler. However, all that is required during the welding is relative movement between the tubing 31 and the cylindrically formed sheet 8 both around and in the direction of the axis of the sheet 8 in order to spirally wind the tubing 31 on the cylindrical sheet 8. Accordingly, the cylindrical sheet 8 may be merely rotated around its axis and the tubing 31 may be fed so it is moved longitudinally of the axis.

Although preferred embodiments of the present invention have been illustrated and described, it will be apparent to those skilled in the art that various modifications may be made without departing from the principles of the invention.

What is claimed is:

1. A method for making a heat exchange panel comprising a sheet of metal having end edges and side edges and having several laterally spaced apart, finite lengths of metal tubing secured by welding to said sheet except at opposite end portions thereof which lengths of opposite end portions are small relative to said finite lengths, said lengths, of tubing extending in the direction from one said end edge to the other of said end edges, said method comprising forming said sheet into a hollow cylinder with said end edges adjacent each other, feeding metal tubing toward and into contact with the exterior surface of said cylinder and while causing relative movement between said tubing and said cylinder both in a direction around the axis of said cylinder and in a direction parallel to said axis of said cylinder, pressing said tubing against said exterior surface of said cylinder as said tubing engages said cylinder, supplying high frequency electric current to said tubing and said cylinder shortly in advance of the point at which they engage and are pressed together to heat the facing surfaces thereof to welding temperature by the time they engage thereby forming a continuous weld between said tubing and said cylinder during the time that high frequency current is supplied to said tubing and said cylinder, interrupting the supply of current to said tubing and said cylinder so that from shortly before to shortly after said end edges pass beneath said tubing, welding of portions of said tubing to said cylinder is prevented, said portions extending circumferentially of said cylinder, being adjacent to said end edges and being small relative to the circumference of said cylinder, and after a plurality of rotations of said cylinder severing said portions of said tubing above said end edges and discontinuing the welding of said tubing to said cylinder to provide a panel having said lengths of tubing welded thereto except at said opposite end portions, and thereafter, forming the cylinder with the tubing welded thereto to the desired shape.

2. A method as set forth in claim 1, wherein said cylinder with the tubing welded thereto is flattened to provide a metal sheet lying substantially in a plane and with said tubes thereon.

3. A method as set forth in claim 1 further comprising separating said end portions of said tubing and the metal of said cylinder.

4. A method as set forth in claim 3, wherein said end portions are separated from the metal of said cylinder by bending them away from the metal of said cylinder.

5. A method as set forth in claim 4 further comprising removing the portions of the metal of said cylinder underlying said end portions.

6. A method as set forth in claim 3, wherein said end portions and said metal of said cylinder are separated by bending the portions of the metal of said cylinder underlying said end portions of said tubing away from said last-mentioned end portions.

7. A method as set forth in claim 3, wherein said end portions and the metal of said cylinder are separated by removing the metal of said cylinder underlying said end portions.

8. A method as set forth in claim 1, wherein said sheet is formed into a hollow cylinder with the adjacent portions of the side edges thereof offset in the direction of the axis of said cylinder.

9. A method as set forth in claim 8, wherein said adjacent portions of the side edges are offset by a distance substantially equal to the desired spacing between said tubes.

10. A method as set forth in claim 1 further comprising securing said end portions of said tubes to a pair of headers with one of said headers at one end edge of said sheet and with the other of said headers at the other end edge of said sheet.

* * * * *